Feb. 17, 1925.

F. H. ROYCE

BRAKE FOR ROAD VEHICLES

Filed May 14, 1924

Inventor:
FREDERICK HENRY ROYCE
Attorney:

Feb. 17, 1925.  1,526,378
F. H. ROYCE
BRAKE FOR ROAD VEHICLES
Filed May 14, 1924   2 Sheets-Sheet 2
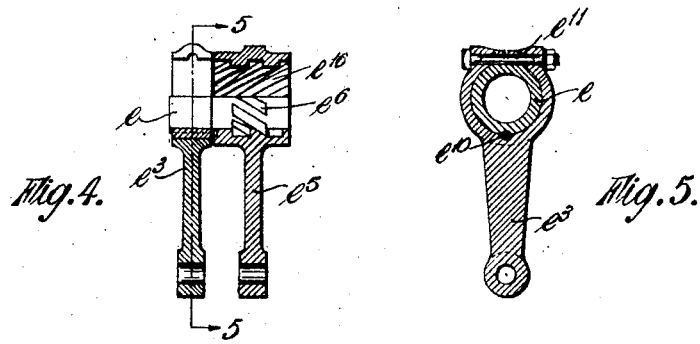
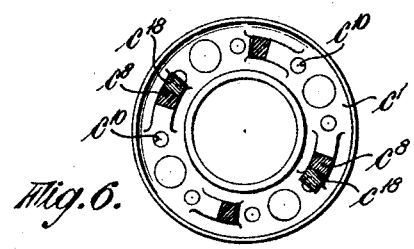
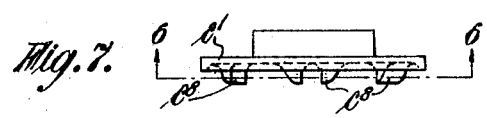
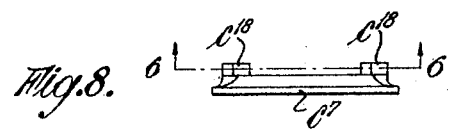
INVENTOR.
Frederick Henry Royce.
ATTORNEY.

Patented Feb. 17, 1925.

1,526,378

UNITED STATES PATENT OFFICE.

FREDERICK HENRY ROYCE, OF DERBY, ENGLAND, ASSIGNOR TO ROLLS ROYCE LIMITED, OF DERBY, ENGLAND.

BRAKE FOR ROAD VEHICLES.

Application filed May 14, 1924. Serial No. 713,283.

*To all whom it may concern:*

Be it known that I, FREDERICK HENRY ROYCE, residing at Derby, England, a subject of the King of Great Britain and Ireland, have invented certain new and useful Improvements in Brakes for Road Vehicles, of which the following is a specification.

This invention has reference to brakes for road vehicles and has for its object the utilization of the rotation of the vehicle wheels on the principle commonly called a "servo" brake for applying pressure on the brakes and also the braking of all the wheels of the vehicle.

According to this invention a shaft (hereinafter called the driving clutch member shaft) is geared to a moving shaft of the vehicle and is always in motion when the vehicle is travelling, and another shaft (hereinafter called the driven clutch member shaft) when rotated through a certain arc operates the rear wheel brakes. Motion is communicated from the driving to the driven clutch member shafts through the instrumentality of a friction clutch, preferably a multi-plate clutch, so that the pressure on the rear wheel brakes varies with the friction produced in the clutch. A lever, preferably a foot pedal operable by the driver, actuates mechanism whereby in the first instance a direct mechanical brake is applied to the front wheels, and immediately upon the brake being resisted by the drum or other device of said front wheel brakes, the clutch is automatically closed and thereby operates the brakes of the rear wheels. A stop is provided which prevents the driven clutch member shaft from rotating to such an extent as to completely wear out, the frictional parts of the rear brakes.

An additional lever, preferably hand operated, is connected to the mechanism and is capable of operating the rear wheel brakes independently of the servo mechanism, said lever being adapted to provide for further application of the rear wheel brakes when the driven clutch member abuts against the stop above mentioned, with the result that warning is given of the state of the rear wheel brake surfaces before they become ineffective.

If desired the converse arrangement can be adopted, to wit, the servo device operating the front wheel brakes.

An example of my invention is illustrated in the accompanying drawings in which:—

Figure 1:
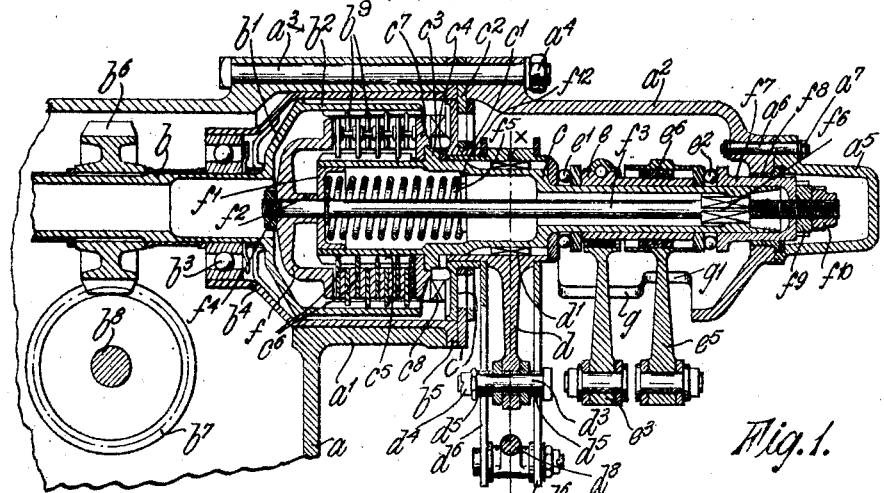
Figure 2:
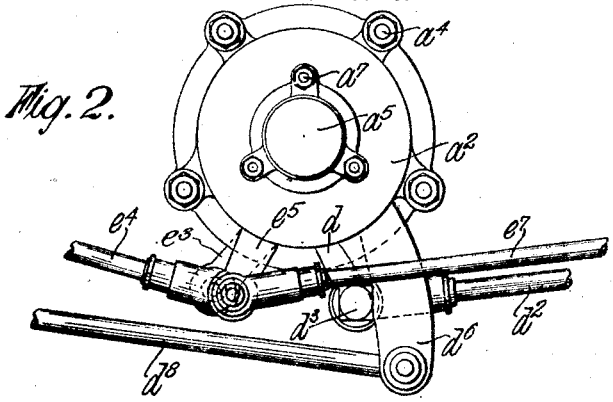
Figure 3:
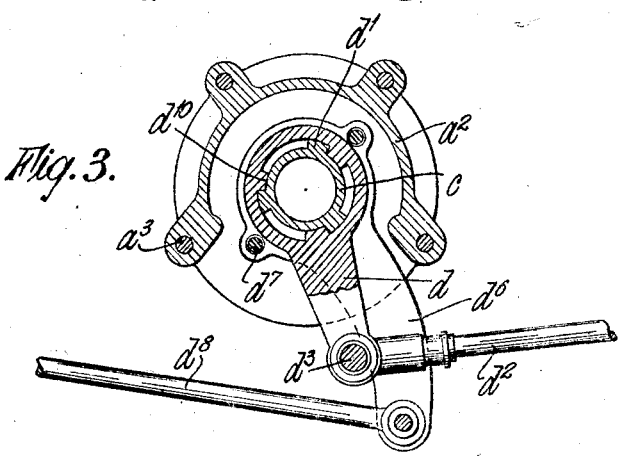

Fig. 1 is a sectional view of the servo mechanism, Fig. 2 an end elevation of Fig. 1 viewed from the right hand, and Fig. 3 a section of Fig. 1 on line X—X. The levers, etc., are shown in the positions they would occupy when both brakes are "off". Fig 4 is a sectional detail view showing certain levers hereinafter referred to. Fig. 5 is a section on line 5—5 of Fig. 4. Fig. 6 is a sectional detail view of elements for preventing excessive rotation of the driven clutch member shaft, the parts in section being taken on line 6—6 of Figs. 7 and 8 which latter figures are edge views of the elements referred to. Fig. 9 is a sectional detail view of a rod $f^3$ hereinafter described.

In said drawings $a$ designates the gear box of an automobile road vehicle (part only shown); $a^1$ a cylindrical extension of the gear box integral therewith and $a^2$ a cylindrical casing for the servo device attached to the said extension by bolts and nuts $a^3$ and $a^4$ respectively and having gaps in its walls for passage of the levers hereinafter described. Between the extension $a^1$ and casing $a^2$ are held the flange $b^5$ of the member $b^4$ and the member $c^2$ both hereinafter referred to. $a^5$ designates an end cover secured to casing $a^2$ by bolts and nuts $a^6$ and $a^7$ respectively.

$b$ designates a shaft (hereinbefore referred to as the "driving clutch member shaft") having formed thereon and integral therewith a flange $b^1$ and a drum $b^2$. Said shaft $b$ rotates in journals or bearings $b^3$ supported by the annular member $b^4$ above mentioned fixed to the casing $a^1$ by means of the flange $b^5$, and carries a worm pinion $b^6$ which meshes with a worm wheel $b^7$ mounted on a shaft $b^8$ in the gear box which is always in rotation when the car is in motion. On the said drum $b^2$ are formed internal axial serrations. $b^9$ designate annular discs provided on their faces with friction material and having serrations formed on their outer circumference engaging with the serrations on the said drum $b^2$.

$c$ designates a hollow shaft (hereinbefore referred to as the "driven clutch member shaft") having bearing in an annular member $c^1$ which is bolted to the member $c^2$ above mentioned through holes $c^{10}$ (Fig. 6) and also in a member $f^7$ hereinafter described. $c^3$ is a collar or flange on the shaft $c$ abutting against an annular member $c^4$ which in turn abuts against the member $c^1$. On the outer circumference of the larger end of the shaft $c$ axial serrations $c^5$ are formed, and $c^6$ are annular plates having on their inner circumference serrations which engage the serrations $c^5$. $c^7$ is an annular plate having serrations on its inner circumference also engaging with the serrations $c^5$. $c^8$ and $c^{18}$ designate dogs extending respectively and alternately from the members $c^1$ and $c^7$ to limit the possible rotational movement of shaft $c$ as predetermined; see more particularly Figs. 6 and 7.

$d$ designates a lever mounted on the shaft $c$ and having serrations or dogs $d^{10}$ formed within its boss which engage like serrations $d^1$ formed on the shaft $c$ but with an amount of back-lash or lost motion as shown in Figure 3, this lever being connected through a rod $d^2$ to the rear wheel brakes (not shown). $d^3$, $d^4$ and $d^5$ designate respectively a bolt, nut and spacing sleeves connecting the rod $d^2$ to the lever $d$ and forming extensions for the purpose hereinafter explained.

$d^6$ is a second lever, formed of two plates bolted together at $d^7$ (Fig. 3) and freely mounted on the boss of lever $d$ and connected through a rod $d^8$ to an operating member such as a hand lever (not shown). The effect of this arrangement is that if, for any reason, the servo brake does not operate, the hand brake lever will act on lever $d^6$ and the two plates thereof will bear on the projections formed by bolt $d^3$ and so operate lever $d$.

$e$ designates a bush rotatably mounted on the shaft $c$ with end thrust bearings $e^1$ and $e^2$ at its ends. $e^3$ designates a lever mounted on and rigidly connected to the bush $e$ by means of a key $e^{10}$ and bolt $e^{11}$ (Fig. 5), said lever $e^3$ being connected through the rod $e^4$ to the front wheel brakes (not shown); $e^5$ is another lever mounted on the bush $e$ and having spiral serrations $e^6$ within its boss engaging similar spiral serrations $e^{16}$ (Fig. 4), in the bush $e$, these serrations being so inclined that on said lever $e^5$ being rocked, if the bush is prevented from rotating, the boss of said lever will move axially to the right in Fig 1. The said lever $e^5$ is connected through rod $e^7$ to the pedal brake lever (not shown).

$f$ designates a bowl shaped presser plate which, when brought into action as hereinafter explained, forces the friction discs $b^9$ and $c^6$ together; $f^1$ is a washer which slides freely in the shaft $c$ and bears against a central projection $f^2$ extending from the presser plate; $f^3$ is a rod threaded at both ends and $f^4$ is a nut engaging the thread on the rod $f^3$ at one end. $f^5$ designates a helical spring acting between the washer $f^1$ and a shoulder $f^{12}$ on the shaft $c$; $f^6$ is a squared portion of the rod $f^3$ fitting a squared portion of the bore of the shaft $c$; (Fig. 7) $f^7$ is an end bearing cap supporting the adjacent end of the shaft $c$ and capable of sliding axially in a bush $f^8$ in the end of the casing extension $a^2$; $f^9$ and $f^{10}$ are respectively a nut and lock nut engaging the thread at the other end of the rod.

A stop to prevent the lever $e^3$ from moving beyond a prescribed limit is formed by the shape of a cut away portion of the casing $a^2$ at $g$ and the casing is also cut away as at $g^1$ to allow the lever $e^5$ to move to a further extent.

The operation of the mechanism described is as follows:—

The shaft $b$, drum $b^2$ and friction plates $b^9$ are always rotating freely while the vehicle is in motion.

On the pedal brake lever being operated, the lever $e^5$ is rocked and the bush $e$ rotated, carrying with it lever $e^3$ which through rod $e^4$ applies the forward wheel brakes. This arrests the movement of lever $e^3$ and hence of the bush $e$ and lever $e^5$. Thereupon the said lever $e^5$ by reason of the spiral serrations $e^6$ and $e^{16}$ moves axially to the right in Fig. 1, carrying with it the cap $f^7$, rod $f^3$ and presser plate $f$. This closes the friction discs and causes shaft $c$ to rotate, carrying with it the lever $d$ which through the rod $d^2$ actuates the rear wheel brakes.

Further pressure on the pedal lever intensifies the pressure of both front and rear wheels brakes in the predetermined ratio.

If any defect should occur in the front wheel brake mechanism whereby the lever $e^3$ is freed to rotate, its movement will be arrested by the stop $g$ and hence the rear wheel brakes will not be thrown out of action.

If on the other hand any defect should occur in the rear wheel brake mechanism or, owing to excessive wear of the shoes or other friction members, the lever $d$ should not be arrested, the rotational movement of the shaft $c$ will be arrested by the dogs $c^8$ and the front wheel brakes will not be thrown out of action. These dogs also stop the rotation of the shaft $c$ if the car is moving backward when the servo device will be out of action.

Further, the rear wheel brakes can, in case of any such defects and also when the car is travelling backwards, be operated by the hand brake lever which will bring lever $d^6$ into operation to actuate lever $d$ and operate the rear wheel brakes.

What I claim as my invention, and desire to secure by Letters Patent of the United States is:—

1. A four-wheel brake system for road vehicles comprising in combination a member permanently geared to a moving part of the vehicle, an element which when rotated through a given arc applies brakes on one pair of wheels only, a friction device whereby the motion of the said member can be communicated to said element, mechanism for applying brakes on the other pair of wheels, and means for operating by a single manual action the friction device and the mechanism of the brakes of said other pair of wheels.

2. In a four-wheel brake system for road vehicles, a servo device, direct-acting brake-applying means, a sleeve, a member whereon said sleeve is mounted for simultaneous rotational movement and relative axial movement, and means whereby one of such movements effects the direct action of the brake applying means and the other of such movements effects the application of the servo device.

3. In a four-wheel brake system for road vehicles, the combination of a rotating drum permanently geared to a moving part of the vehicle and carrying one element of a friction device, a shaft extending within said drum and carrying the other element of said friction device, a lever carried by said shaft and adapted to apply the brakes of one pair of wheels, a bush freely mounted on the said shaft, a second lever mounted on and rigidly secured to such bush and adapted when operated to apply the brakes of the other pair of wheels, a third lever mounted on said bush and adapted to be manually operated, a sliding member caused to move axially by the third lever, a rod attached to said sliding member to move therewith, a spring bearing against said rod to oppose its movement, and a presser plate secured to said rod and adapted to close the elements of the friction device.

4. A four-wheel brake system for road vehicles, comprising, in combination, a shaft permanently geared to a moving part of the vehicle; a second shaft; means mounted on the second shaft and connected to apply brakes on one pair of wheels only; a friction device whereby the movement of the first-mentioned shaft can be communicated to said second shaft; a lever mounted on said second shaft with an amount of back lash and connected to apply brakes on the other pair of wheels; a second lever freely mounted in relation to the said second shaft and adapted to actuate the first lever under predetermined conditions; and means under manual control connected to operate said second lever.

5. A four-wheel brake system, according to claim 4, in which stop means are provided adapted to arrest movement of the second shaft irrespective of its arrest by the resistance of the brake mechanism, and also adapted to arrest its movement when the vehicle is travelling backwards.

6. A four-wheel brake system, according to claim 4, in which the means mounted on the second shaft and connected to apply brakes to one pair of wheels only embodies a lever; and in which a stop is provided adapted to arrest the movement of that lever at a predetermined point irrespective of its arrest by the resistance of the brake mechanism.

7. A four-wheel brake system, according to claim 4, in which the means mounted on the second shaft and connected to apply brakes to one pair of wheels only, comprises a bush rotatably fitted on said shaft, and a lever keyed to said bush; and in which a stop is provided adapted to arrest the movement of said keyed lever at a predetermined point irrespective of its arrest by the resistance of the brake mechanism.

8. A four-wheel brake system for road vehicles, comprising, in combination, a shaft permanently geared to a moving part of the vehicle; a second shaft; a bush rotatably mounted on the second shaft; a lever keyed to the bush and connected to apply brakes on one pair of wheels only; a pedal-operated lever mounted on said bush to rotate the same and thereby actuate the first lever; means for communicating the rotary movement of the first shaft to the second shaft; and a lever mounted on the second shaft with an amount of back lash and connected to apply brakes on the other pair of wheels.

In witness whereof I have signed this specification.

FREDERICK HENRY ROYCE.